July 24, 1956 J. M. JEPSEN 2,755,676
VARIABLE SPEED TRANSMISSION
Filed May 27, 1953 2 Sheets-Sheet 1

INVENTOR
Jens M. Jepsen
BY Watson, Cole, Grindle & Watson
ATTORNEYS

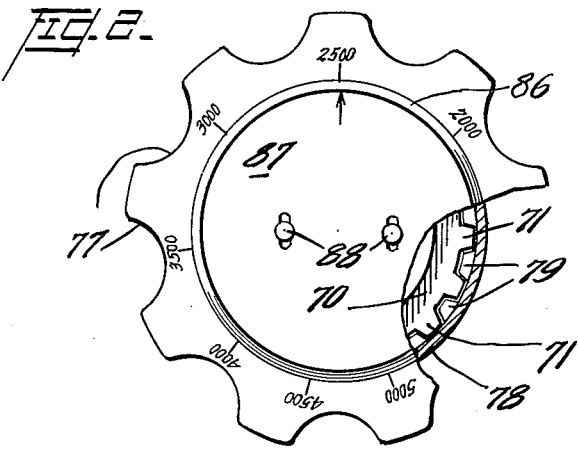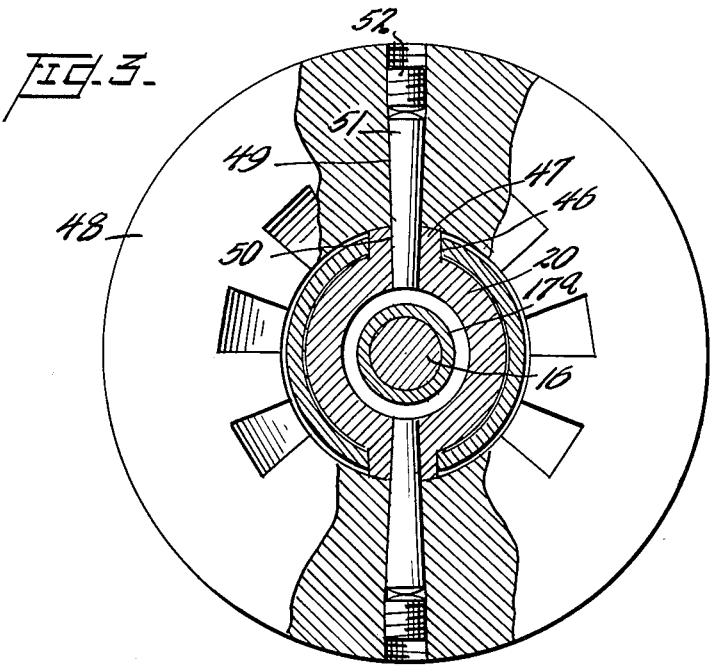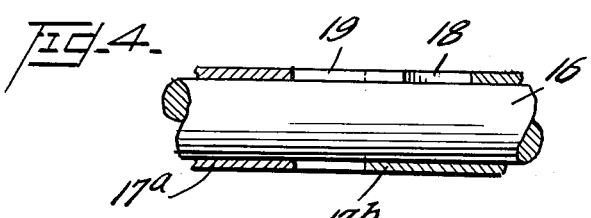

United States Patent Office 2,755,676
Patented July 24, 1956

2,755,676

VARIABLE SPEED TRANSMISSION

Jens M. Jepsen, Elizabeth, N. J., assignor, by mesne assignments, to American Type Founders Co., Inc., Elizabeth, N. J., a corporation of Delaware Application May 27, 1953, Serial No. 357,766

6 Claims. (Cl. 74—230.17)

This invention relates to variable speed transmission and is particularly directed to a mechanism of this type having two outer cone members disposed on either side of an inner double cone member, comprising a pair of split V-pulleys, and means for effecting relative axial or longitudinal movement between the inner and outer members.

The broad obect of this invention is to provide an improved transmission which is compact in arrangement, durable in construction and which will function for long periods of heavy-duty operations without change in operating characteristics.

Specifically, this invention has for its object the provision of a transmission with which, by virtue of its novel design, speed changes during operation may be carried with both celerity and facility.

A further object is to provide a transmission in which the elements of the speed changing mechanism are in frictional contact with each other over a minimum area and are separated from the rotating pulley elements by anti-friction means whereby the dynamic friction in the transmission resisting manipulation of the speed changing mechanism is maintained at a minimum level.

Another object of the invention is to provide a transmission having a speed changing mechanism which is constrained against unintentional variation.

Other and further objects and advantages of the invention will appear as the detailed description proceeds when taken in connection with the drawings in which—

Figure 2 is a view of the handwheel, partially cut away to reveal the connection between the wheel and the sleeve drive member;

Figure 3 is an end view of the inner cone view, taken partially in section along line 3—3 of Figure 1 and Figure 4 is a fragmentary section on line 4—4 of Figure 1.

Figure 1:
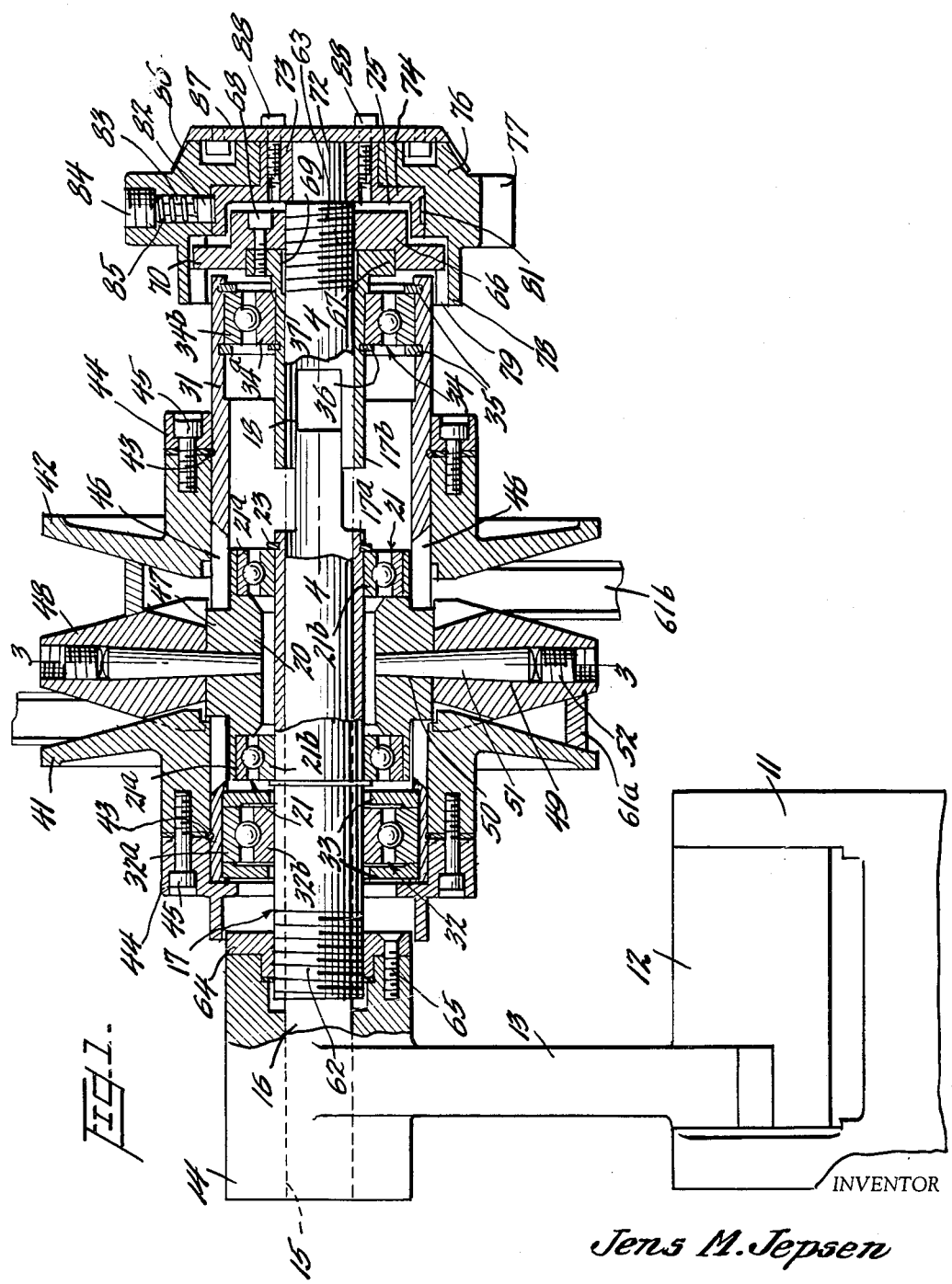
Figure 1 is an enlarged view of the transmission, partially in section along a vertical plane through its longitudinal axis, and partially in elevation.

Reference is made to Figure 1 in which the numeral 11 designates a bracket affixed to any suitable stationary base or support, not shown. Mounted in bracket 11 for pivotal movement about a horizontal axis is a hub 12 having a radially projecting arm 13 which is provided at its free end with a tubular head 14. The head 14 has a bore 15 therein for non-rotatably receiving one end of a rigidly supported, horizontally extending shaft 16.

Enveloping shaft 16 and slidably supported thereby is a tubular sleeve 17 made up of two sections, 17a and 17b, respectively, which are coupled together for rotation as a unit but for separate movement longitudinally of shaft 16 by means of a slot 18 provided in one of said sleeves and a tongue 19 provided on the other of said sleeves, tongue 19 fitting into slot 18 and being slidable with respect thereto. The first section 17a of sleeve 17 extends a major portion of the length of shaft 16, being somewhat longer than second section 17b, and is encircled by a concentric inner cylinder 20. Each end of inner cylinder 20 is formed to receive the outer race 21a of a ball bearing 21 and the inner race 21b of these bearings closely engages the outer surfaces of sleeve section 17a. Bearings 21 are held in spaced relation by inner cylinder 20 and are prevented from sliding longitudinally of sleeve section 17a by snap rings 23, inner cylinder 20 thus being mounted for free rotation on sleeve 17a but constrained to move longitudinally therewith.

Encircling sleeve sections 17a and 17b and inner cylinder 20 is an outer cylinder 31 which is of a length substantially greater than inner cylinder 20 but somewhat less than that of shaft 16. One end of outer cylinder 31 is slidably supported on sleeve section 17a by an anti-friction bearing 32, the outer race 32a of which is maintained in position with respect to outer cylinder 31 by means of confining rings 33 with the inner race 32b free to slide along sleeve section 17a. The other end of outer cylinder 31 is supported upon sleeve section 17b by an anti-friction bearing 34 having its outer race 34b confined on the inner surface of outer cylinder 31 by means of snap rings 35 and its inner race 34a confined on the outer surface of sleeve section 17b by means of a snap ring 36 and a shoulder 37 formed on sleeve section 17b so that outer cylinder 31, while being rotatably supported by both sleeve sections, moves longitudinally with section 17b alone.

A pair of outer sheave members 41 and 42, each having an inwardly facing conical surface, is supported in fixed axially spaced relation on outer cylinder 31 by means of snap rings 43 and retaining rings 44, the latter being secured to the sheave members by screws 45 or other suitable securing devices. Formed in the midsection of outer cylinder 31, that is, the section lying intermediate outer sheave members 41 and 42 are two or more longitudinally extending slots 46 which are penetrated by an equal number of lugs 47 constructed integrally with inner cylinder 20 and extending radially therefrom. Rigidly supported by the lugs 47 is a center sheave member 48 which is annular in cross-section, encircling the outer cylinder 31 with adequate clearance between the adjacent faces of center sheave member 48 and outer cylinder 31 to prevent binding therebetween. To further insure a rigid support for the center sheave member 48, the member is provided with two or more apertures 49 which extend radially through lugs 47, registering with corresponding apertures 50 in inner cylinder 20, and through which taper pins 51 are passed, being retained therein by set-screws 52.

There is formed on center sheave member 48 two opposed conical faces which define with the conical faces of outer sheave members 41 and 42 a pair of split V-pulleys. As is well known in the art, the split V-pulleys are engaged by V-belts 61a and 61b, one of which engages a motor driven pulley, not shown, and the other of which engages a pulley, not shown, intended to be driven at varying rates of speed. The V-belts are preferably disposed in parallel planes normal to the axis of the pulleys as well as to the axes of the driving and driven pulleys and, throughout the operation of the transmission, maintain this fixed spaced relationship with each other.

In order to effect longitudinal movement of sleeve section 17a, the end of this section adjacent tubular head 14 is threaded, as at 62, with threads of one direction, say, left-hand, which are engaged by internal threads of a corresponding direction formed on the inner face of an annular member 64. The annular member 64 is non-rotatively secured to tubular head 14 as by means of screws 65 or other suitable securing devices. Thus, rotation of the sleeve section 17a will cause said section to gradually move longitudinally of the shaft 16 in a given direction.

It is necessary that the sleeve section 17b be capable of moving longitudinally of shaft 16 much as in the same way as is sleeve section 17a but in the opposite direction and this is accomplished in the following manner: A section of shaft 16 adjacent the free end thereof carries threads 63 of a direction opposite to those on sleeve section 17a, i. e., right-hand, which are engaged by an annular internally tapped member 66. The member 66 is attached to an enlarged section 67 formed on the end of sleeve section 17b remote from sleeve section 17a in any suitable manner, for example, by screws 68, and the diameter of the bore of sleeve section 17b is increased slightly adjacent its remote end, as at 69, so as to clear the threads on shaft 16. Hence, member 66 and sleeve section 17b rotate as a unit and during rotation thereof, move longitudinally of shaft 16 in a direction opposite to that of sleeve section 17a. Formed integrally with member 66 is a radially extending flange or lip 70 which extends beyond the outer face of outer cylinder 31, having around its periphery a series of external teeth 71 for a purpose as will hereinafter appear.

The extreme remote end of shaft 16 is turned down and onto this reduced section 72 there is press fitted a collar 73 having a section 74 of enlarged diameter, the inner face of which is recessed, as at 75, to loosely fit over and around the main body of member 66. Rotatably encircling collar 73 and enlarged section 74 is a hand wheel 76, the periphery of which is cut away to yield indentations or scallops 77 whereby it may be gripped and turned by hand. Carried by hand wheel 76 is an axially projecting annular flange 78 bearing internal teeth 79 which mesh with teeth 71 fashioned on member 67, being best shown in Figure 2. Consequently, a driving connection is established between hand wheel 76 and member 67 and sleeve section 17b which transmits rotation of the hand wheel to member 67 and section 17b but permits the latter to move longitudinally relative to the hand wheel.

It is desirable that hand wheel 76 be prevented from undergoing inadvertent or accidental rotation while the transmission is in operation and, to this end, there is provided around the external periphery of enlarged section 74 a series of shallow teeth or depressions 81 which are adapted to be engaged by a spring pressed detent 82 disposed inside a recess 83 in hand wheel 76 and retained therein by means of a threaded plug 84. The spring constant of the spring 85 acting upon detent 82 is so selected that it will yield under the application of a reasonable amount of torque to hand wheel 76 but will not permit detent 82 to become disengaged from depressions 81 due to vibration or the like.

As is shown in Figure 2, hand wheel 76 is preferably constructed with an inclined peripheral surface 86 upon and around which is inscribed suitable indicia corresponding to the range of speeds which may be obtained with the transmission. Upon rotation of hand wheel 76, these indicia are caused to register with an index mark or character formed on a face plate 87 secured to collar 73 by means of screws 88, thereby indicating the particular speed at which the transmission is operating at a given setting. Face plate 87 also serves the function of preventing endwise displacement of hand wheel 76 relative to shaft 16.

The operation of the transmission is as follows: The arm 13 being pivotably supported is free to swing in a vertical plane and hence the transmission including the split V-pulleys will raise or lower to compensate for the varying distances between the centers of the pulleys engaged by the V-belts 61a and 61b. As it is desired to increase the speed of the driven pulley hand wheel 76, as viewed from Figure 2, is turned in a clockwise direction, whereby member 66 and sleeve section 17b as well as outer sheave members 41 and 42 are moved toward the left in Figure 1. By virtue of its tongue and slot connection with sleeve section 17b, sleeve section 17a is also rotated but since its threaded relationship with member 64 is of a hand opposite to that of the threaded relationship between member 66 and shaft 16, it and center sheave member 48 will be moved to the right in Figure 1. Obviously, to decrease the speed, hand wheel 76 is turned in the reverse direction.

It will thus be apparent that I have provided an improved variable speed transmission which is virtually free from any tendency to wear during operation since the sheave members are mounted for practically frictionless rotation and are firmly supported against tilting due to unbalanced belt pressures. Again, as a consequence of my uniquely designed speed changing mechanism in which the moving elements have a minimum of surface area in frictional contact only a modicum of force is required to effect changes in speed. Furthermore, because of the very small amount of friction resisting speed changes, I am able to employ in the speed changing mechanism members having threads thereon of a pitch substantially greater than has hitherto been possible in the art with the result that the unit may be moved through its full speed range by rotating the hand wheel through a much smaller arc than has been necessary with prior devices of this character. Another feature of the present invention resides in the anti-rotational device associated with the hand wheel which prevents the machine from undergoing changes in speed except when force is actually applied to the hand wheel to bring about this result.

It is to be understood that the form of my invention herewith shown and described is to be taken as a preferred example of the same and that various changes in the shape, size, and arrangement of parts may be resorted to without departing from the scope of my invention or the scope of the appended claims.

Having thus described my invention, that which is claimed is:

1. In a variable speed transmission, in combination, a fixed supporting shaft having threads of one hand at one end thereof, a sleeve encircling said shaft, said sleeve comprising two sections, one extending a major portion of the shaft length and the other a minor portion of the shaft length, said latter section being threaded for engagement with the threads on said shaft, a connection between said sleeve sections permitting relative longitudinal movement but preventing relative rotational movement therebetween, a rotatable cylinder concentric with said shaft and sleeve and having one end slidably supported on said first sleeve section and the other supported on said second sleeve section for longitudinal movement therewith, the midsection of said cylinder being slotted, spaced outer sheave members carried by said cylinder for rotation therewith, one on each side of said slotted midsection, a center sheave member encircling said midsection but out of contact therewith, lugs rotatably supported by said first sleeve section and projecting through the slots in said outer cylinder to engage and support said center sheave member, fixed means disposed on said first sleeve section, said means having threads of a hand opposite to that of the threads on said shaft which engage corresponding threads on said first section, and hand operated means for rotating said sleeve sections whereby upon rotation said sections and the cylinder and sheave members associated therewith are moved longitudinally relative to each other.

2. In a variable speed transmission having spaced concentric inner and outer cylinders adapted to carry inner and outer sheave members for relative axial movement, mechanism for supporting said cylinders for rotation about their common axis and for relatively adjusting them longitudinally of said axis comprising a sleeve having two sections, one longer than the other, a connection between said sleeve sections permitting relative axial movement but preventing relative rotational movement, means supporting said sleeve sections, anti-friction means fixedly mounted on said first sleeve section to rotatably support said inner cylinder, a first anti-friction means slidably mounted on said first sleeve section to rotatably support one end of said outer cylinder, a second anti-friction means fixedly mounted on said second sleeve section to support the other end of said outer cylinder, fixed means disposed in threaded relation on said first sleeve section and adapted to cause upon rotation of said sleeve sections in a given direction longitudinal movement of said first section in one direction, fixed means disposed in threaded relation with said second sleeve section and adapted to cause upon rotation of said sleeve sections in said given direction longitudinal movement of said second section in a direction opposite to that of said first section, and manually operated means for rotating said sleeve sections.

3. The transmission as in claim 2 wherein said connection between said sleeve sections comprises a slot in one of said sections and a tongue carried by the other of said sections, said tongue slidably fitting into said slot.

4. The transmission as in claim 2 wherein said means for supporting said sleeve sections comprises a fixed shaft extending through said sections and projecting therebeyond at at least one end thereof and said manually operated means includes a hand wheel rotatably supported by the projecting end of said shaft and a sliding connection between said hand wheel and one of said sleeve sections.

5. The transmission as in claim 4 wherein said manually operated means further includes a spring biased detent associated with said hand wheel for preventing inadverent rotation thereof with respect to said shaft.

6. The transmission as in claim 4 wherein said sliding connection comprises internally toothed means on said hand wheel and an externally toothed member carried by said shaft, meshing with said internally toothed means, said member being joined to said sleeve section.

References Cited in the file of this patent

UNITED STATES PATENTS

| | | |
|---|---|---|
| 2,348,994 | Otto | May 16, 1944 |

FOREIGN PATENTS

| | | |
|---|---|---|
| 672,599 | Great Britain | May 21, 1952 |